United States Patent [19]
Nystuen

[11] 4,086,975
[45] May 2, 1978

[54] ARTICULATED TRACTOR WITH MULTIPLE POWER PLANTS

[75] Inventor: Paul A. Nystuen, Longmont, Colo.
[73] Assignee: Steiger Tractor Inc., Fargo, N. Dak.
[21] Appl. No.: 746,156
[22] Filed: Nov. 30, 1976
[51] Int. Cl.$^2$ .................. B62D 59/04; B62D 61/00
[52] U.S. Cl. .................. 180/14 R; 180/11; 180/54 C; 180/139; 180/22; 280/413; 280/111
[58] Field of Search .............. 180/14 R, 14 A, 14 D, 180/9.4, 11, 22, 23, 24.03, 29, 52, 54 C, 134, 136, 139, 77; 280/411 R, 412, 413, 111

[56] References Cited

U.S. PATENT DOCUMENTS

| | | | |
|---|---|---|---|
| 2,407,007 | 9/1946 | Henrichsen | 180/12 X |
| 2,922,237 | 1/1960 | Harrison | 180/139 |
| 3,097,719 | 7/1963 | Rood | 180/136 |
| 3,269,481 | 8/1966 | Peterson | 180/139 |
| 3,334,702 | 8/1967 | Granryd | 180/11 |
| 3,605,928 | 9/1971 | Loesch | 280/413 |
| 3,651,882 | 3/1972 | Loesch | 280/413 |
| 3,933,216 | 1/1976 | Irwin | 180/69 C |
| 3,963,086 | 6/1976 | Mason | 180/12 X |
| 3,973,639 | 8/1976 | Stewart | 180/14 R |

Primary Examiner—Kenneth H. Betts
Attorney, Agent, or Firm—Frederick E. Lange

[57] ABSTRACT

An articulated tractor in which there is a front first tractor vehicle and rear second and third tractor vehicles, each of the tractors having an engine for driving the wheels of the tractor and the first tractor having an operator's compartment, the second and third tractors being connected to the first tractor through a cross bar pivotally secured adjacent its longitudinal midpoint to the rear of the first tractor for pivotal movement both about a generally vertical axis and a generally horizontal axis. The rear second and third tractors are secured to the cross bar by pivotal connections at points equally spaced from the first pivotal means so that the longitudinal axis of the second and third tractors are normally substantially parallel to each other. The steering is accomplished by a steering control in the operator's compartment which changes the angular relationship about a vertical axis of the cross bar to the first tractor vehicle to cause the longitudinal axes of the second and third tractor vehicles to assume temporarily an angular relationship with the longitudinal axis of the first tractor vehicle. The pivotal connections of the second and third tractor vehicles to the cross bar are designed to permit pivotal movement of these vehicles with respect to the cross bar about their longitudinal axes. There is also a further cross bar pivotally connected to the second and third tractor vehicles at the rear thereof in such a manner as to allow turning of the tractor vehicles about their longitudinal axes with respect to the second cross bar. In addition to the two cross bars, there are pull rods extending between the cross bars so as to transmit pulling forces from the front cross bar to the rear cross bar. The implement to be pulled is coupled to the rear cross bar. There preferably are three cross bars, one in the center and one extending between the front and rear pivotal connections of the second and third tractors to the two cross bars. The cross bar is connected to a front tractor by means of a center yoke which is pivoted about a generally vertical axis to the front tractor vehicle and is pivoted about a generally horizontal axis to the cross bar.

9 Claims, 6 Drawing Figures

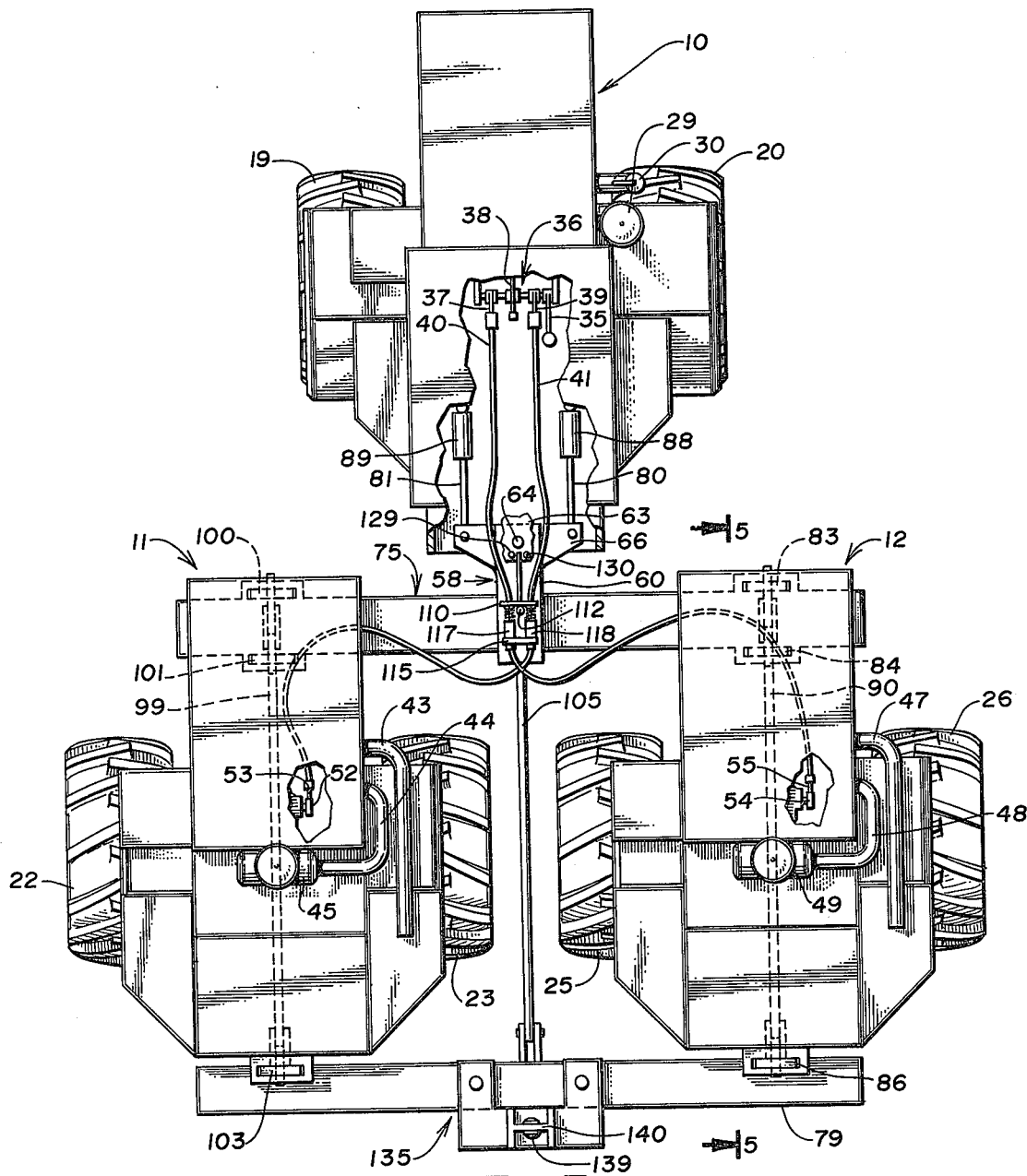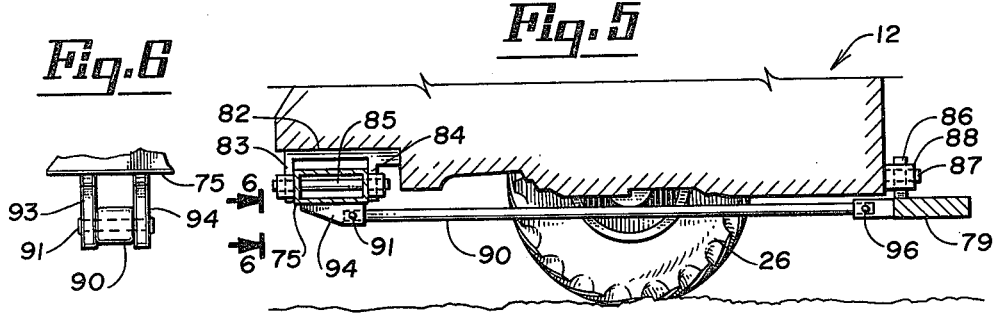

U.S. Patent May 2, 1978 Sheet 2 of 3 4,086,975
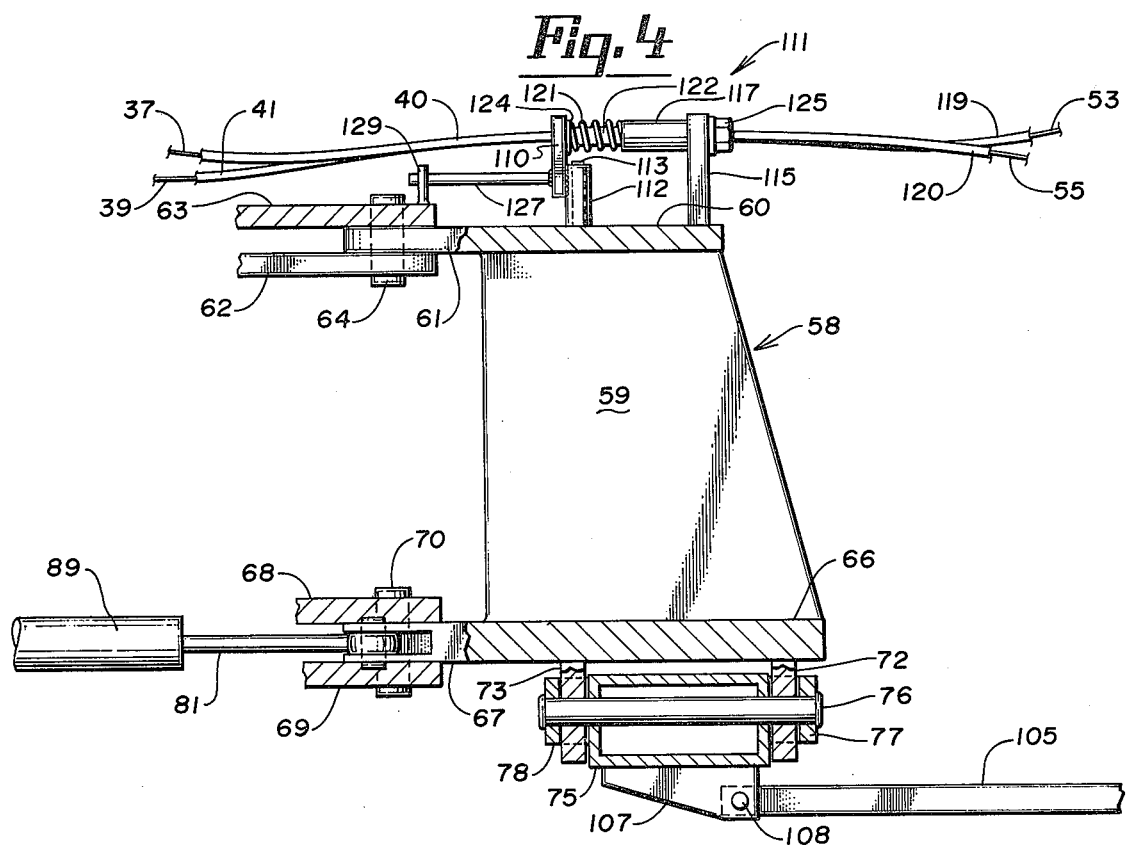
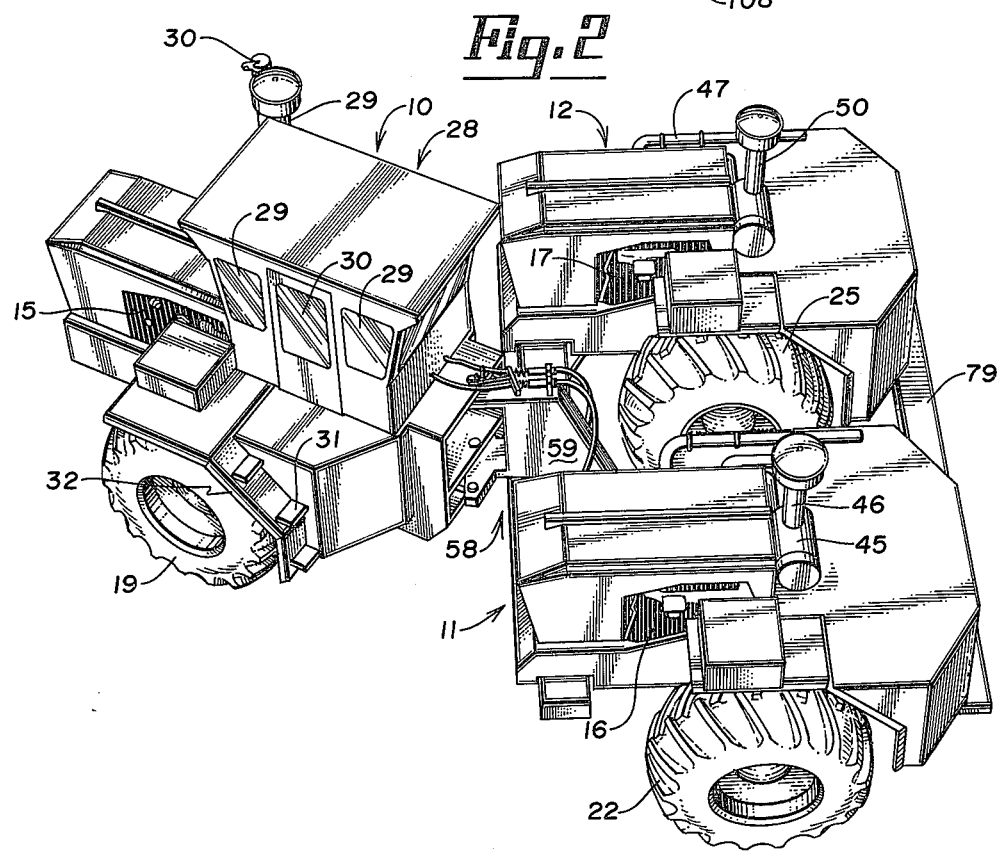

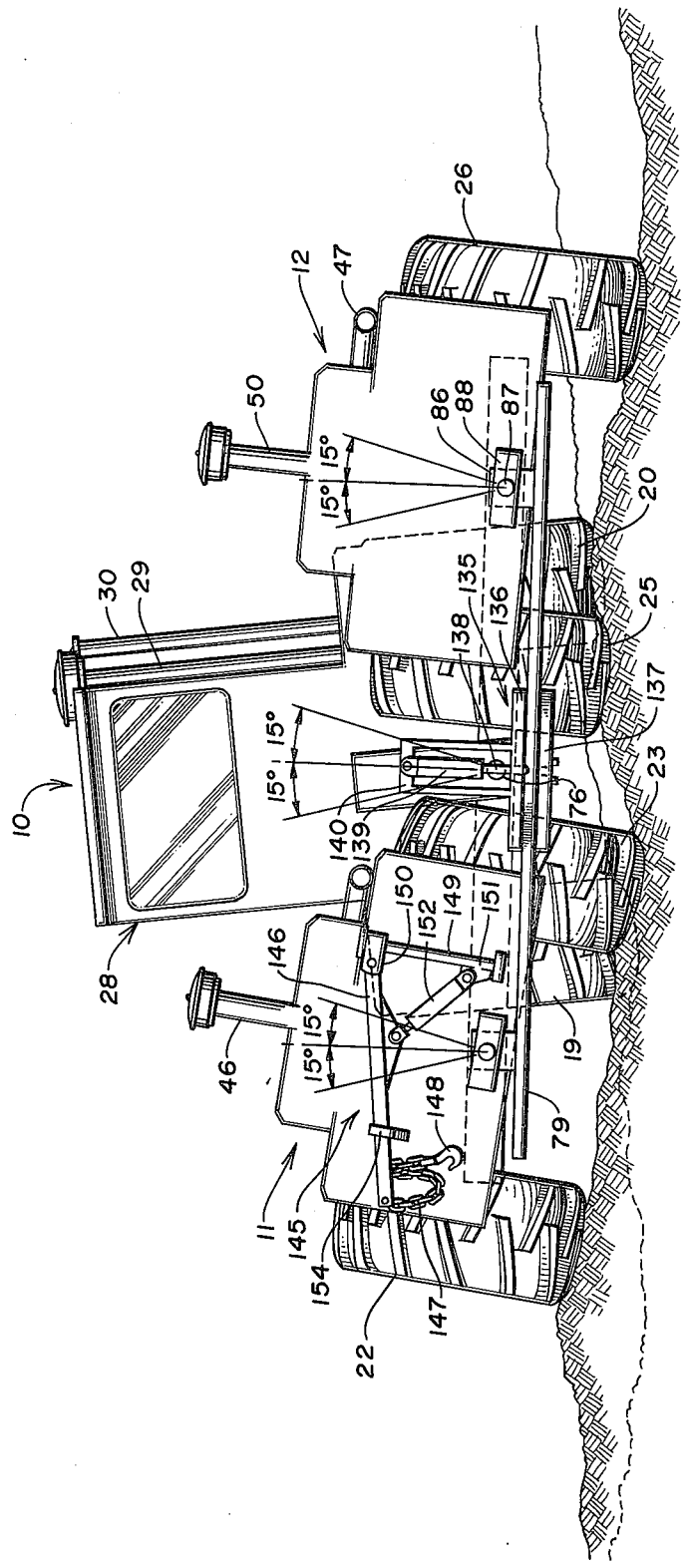

ARTICULATED TRACTOR WITH MULTIPLE POWER PLANTS

BACKGROUND OF THE INVENTION

To an increasing extent in recent years, tractors have become larger and larger. One tractor in common use today employs two sections articulated with respect to each other and an engine having over 250 drawbar horsepower. The reason for these very large tractors is that the farms on which they are used have greatly increased in size without any corresponding increase in the number of people doing the farming. It has accordingly become desirable to employ a very large tractor so that very wide implements can be pulled by it. This enables the ground to be covered in a shorter period of time by a single operator.

From a practical standpoint, there tends to be an upper limit on the size of the engine which may be used in a tractor. Consequently, as more and more power is necessary with ever larger tractors, some means must be developed for providing for a plurality of engines in connection with any one tractor. A number of arrangements have been developed in which there are one or more tractor vehicles serially connected behind one another, each tractor vehicle having its own engine. Also, it has been proposed to have two engine driven units, each driving their own ground engaging member, rigidly secured side by side. Both types of arrangements, however, have serious drawbacks. In the first place, if the vehicles are simply connected serially, this results in a train of vehicles which may become unduly long. Furthermore, all of the power has to be transmitted from the front vehicle through the train to the rear vehicle to which the implement is connected. Moreover, the implement must, of necessity, be connected through a rear vehicle and the more units there are in series, the further the implement will be from the operator. This has the drawback that if something is working improperly in the rear of the vehicle, it becomes more difficult for the operator who is in the lead tractor vehicle to see what is going wrong. In some cases, the implement requires an operator to ride with the implement. The farther back the implement is, the more difficult it becomes for the operator in the tractor and the operator in the implement to communicate with each other. Furthermore, where there are a number of vehicles connected serially, the wheels tend to follow in the same tracks and unduly pack the ground.

While, as indicated above, it is proposed to mount two units rigidly together side by side, this presents the problem that with very uneven ground, there is considerable twisting force exerted on the tractor.

SUMMARY OF THE PRESENT INVENTION

The present invention is concerned with a tractor arrangement in which there are at least three tractor vehicles, each with its own engine and pair of wheels driven by the engine, the first tractor vehicle having an operator's compartment and in which the second and third tractor vehicles are disposed side by side and connected to the first tractor vehicle through a cross bar which is pivotally secured adjacent its midpoint to the rear of the first tractor vehicle for pivotal movement about both a vertical and a horizontal axis, the second and third vehicles being connected to the cross bar by pivotal connections. With such an arrangement, the unit is much more compact longitudinally. Furthermore, the various sets of wheels are offset with respect to each other so that no set of wheels follows in the path of another set of wheels. This results in much less compaction of the ground than is the case when the tractor vehicles are serially connected to each other, one behind the other.

The steering is accomplished by changing the angular relationship about a vertical axis of the cross bar to the first tractor vehicle to cause the longitudinal axis of the second and third tractor vehicles to assume temporarily an angular relationship with the longitudinal axis of the first tractor vehicle.

It is also desirable that the means for pivotally connecting the second and third tractor vehicles to the cross bar provide for pivotal movement of the second and third tractor vehicles about their longitudinal axes to accommodate using the tractor on irregular ground without causing stresses on the frame. It is further contemplated that there will be a second cross bar pivotally connected to the second and third tractor vehicles at the rear thereof. The two cross bars may be connected by pull rods extending between them to transmit pulling forces from the first cross bar to the second one. The second cross bar will then have means for coupling the same to an implement to be pulled by the tractor.

The second and third tractors are preferably connected to the second cross bar so as to permit longitudinal rocking of the vehicles about their longitudinal axis with respect to the second cross bar so that the second and third vehicles can not only turn with respect to the first vehicle as far as their general angular direction is concerned but they may independently rock with respect to each other and with respect to the tractor vehicle.

The cross bar to which the fronts of the second and third tractor vehicles are connected is connected through a pivotal means which may take the form of a center yoke which is pivoted about a generally vertical axis near the front thereof to the first tractor vehicle and is pivoted about a generally horizontal axis to the cross bar. Steering is accomplished by changing the angle of this center yoke with respect to the first tractor vehicle and hence changing the angle of the cross bar.

Various other features and objects of the invention will be apparent from a consideration of the accompanying specification, claims and drawing.

BRIEF DESCRIPTION OF THE DRAWING

FIG. 1 is a plan view, with portions broken away, of the improved tractor of the present invention;

FIG. 2 is a perspective view of the improved tractor with the front tractor vehicle being turned with respect to the rear second and third tractor vehicles;

FIG. 3 is a rear view of the tractor showing the manner in which the various tractor units may tilt with respect to each other;

FIG. 4 is a view partly in section showing the center yoke construction between the front tractor vehicle and the front cross bar;

FIG. 5 is a sectional view taken along the line 5—5 of FIG. 1; and

FIG. 6 is an end view of a portion of FIG. 5 as viewed in the direction of the arrow 6—6 of FIG. 5.

Referring to the drawing, the improved tractor comprises a first tractor vehicle generally indicated by the reference numeral 10 and second and third tractor vehicles indicated by the reference numerals 11 and 12. As will be explained, the invention is applicable to the use of more tractor vehicles, but for purposes of simplicity has been illustrated and described in connection only with three tractor vehicles. As best shown in FIG. 2, the forward vehicle 10 is provided with an engine 15 and the rear tractor vehicles 11 and 12 with engines 16 and 17, respectively. These engines are only partially shown in FIG. 2. The front vehicle 10 is provided with a pair of wheels 19 and 20 visible in FIG. 1. These wheels are driven by the engine 15 of the vehicle 10. Similarly, tractor vehicle 11 has a pair of wheels 22 and 23 driven by the engine 16. Similarly, vehicle 12 has a pair of wheels 25 and 26 driven by the engine 17.

It is to be understood that each pair of wheels in connection with each of the vehicles is mounted on a driven axle which is connected through suitable transmission and differential mechanisms with the engine in question. In each case, neither the axle nor the wheels are turnable about a vertical axis with respect to the vehicle and the steering is done through turning the relative positions of the vehicles in a manner to be subsequently described.

The front vehicle 10 is a vehicle in which the operator's controls are located. This vehicle may be very similar to the front portion of the vehicle shown in the Irwin U.S. Pat. No. 3,933,216. As with the tractor in that patent, the front vehicle 10 is provided with an operator's cab 28. This cab may have a plurality of windows 29 and an access door 30. Access to the door 30 may be had by steps 31 located on the fender 32 as better shown in the aforesaid Irwin patent. Located adjacent to the front corner of the operator's compartment 28 is an air intake pipe 29 and an exhaust stack 30. The air intake 29 is connected to an air cleaner and from there to the intake manifold of the engine. The exhaust pipe 30 leads from the exhaust manifold of the engine 15. It will be understood that the driver's compartment 28 is provided with a driver's seat and with various controls. For the purpose of the present invention we have shown, in somewhat schematic form, only the throttle control which comprises a lever 35 which through a suitable mechanism 36 is designed to actuate throttle cables 37, 38 and 39. Throttle cable 38 goes to the throttle of the engine 15 in tractor 10. As will be explained in more detail, the throttle cables 37 and 39 which extend through suitable cable housings 40 and 41, are employed to control the throttles of the engines of tractors 11 and 12.

The engine 16 of tractor vehicle 11 is equipped with exhaust pipe 43 leading from the exhaust manifold and an intake pipe 44 leading from an air cleaner 45 to which an air intake pipe 46 is connected. Similarly, engine 17 is provided with an exhaust pipe 47, an air intake pipe 48, an air cleaner 49 and an air intake stack 50. The engine 16 of vehicle 11 is also supplied with a throttle control lever 52 to which the inner end of cable 53 is connected. Likewise, the engine of tractor vehicle 12 is provided with a throttle control lever 54 to which is connected throttle control cable 55. The operation of throttle control cables 53 and 55 will be described later.

Referring now to the manner in which the various tractor vehicle units are interconnected, lead tractor vehicle 10 is provided with a center yoke 58. This center yoke comprises two spaced vertical side walls 59 generally trapezoidal in shape which are connected at their upper ends by a top wall 60, as best shown in FIG. 4. The top wall 60 has a forwardly extending portion 61 which is disposed between two ears 62 and 63 integrally joined with the frame of the lead tractor vehicle 10. Forwardly extending portion 61 of top wall 60 is pivotally secured to the plates 62 and 63 by a pivot pin 64. The lower ends of the two spaced side walls 59 are joined by a bottom wall 66 having a forwardly extending portion 67 disposed between two plates 68 and 69 which likewise are integral with or rigidly joined to the lead tractor. A pivot pin 70 is effective to join the forwardly projecting portion 67 of the bottom wall 66 with the two spaced plates 68 and 69. It will be noted that pins 64 and 70 are aligned so that the center yoke 58 will pivot about a vertical axis defined by the pins 64 and 70.

The lower wall 66 has a triangular forward portion as best shown in FIG. 1. Pivotally connected to the outer forward extremities of this triangular portion of wall 66 are two rods 80 and 81 which in turn are connected to the pistons of hydraulic motors 88 and 89. It will be obvious that if fluid is admitted to the inner end of the cylinder of hydraulic piston 88, for example, and fluid is allowed to leave the same end of the hydraulic cylinder operator 89, the center yoke 58 will pivot in a clockwise direction about the pivot pins 64 and 70. As will be more clear from the subsequent description, this is used for steering the tractor. The operation of hydraulic motors 88 and 89 is under the control of the steering wheel in the operator's cab. When it is desired to turn to the left, for example, fluid is admitted to the inner side of cylinder 88 and allowed to leave the inner side of cylinder 89, as just explained. This tends to force the center yoke 58 in a clockwise direction. This tends to cause the vehicle 10 to move in a counterclockwise direction with respect to the center yoke 58.

Referring now to FIG. 4, it will be noted that two ears 72 and 73 extend downwardly from lower plate 66 of the center yoke 58. A hollow beam 75 is pivotally connected to the center yoke 58 by a pivot pin 76 which extends through the beam and the ears 72 and 73. Washers 77 and 78 may be interposed between the outer side of the ears 72 and 73 and the outer head of the pin 76 which may be secured against actual movement in any given manner such as by being peened over against the washer 77 or washer 78 or may have both a head and nut associated therewith.

The beam 75, as best shown in FIG. 1, functions as a cross bar which serves as a portion of the means for interconnecting the lead tractor vehicle 10 to the rear tractor vehicles 11 and 12. There is also a second cross bar 79 which extends between the rear ends of the tractor vehicles 11 and 12 and serves to couple the rear tractor vehicles 11 and 12 together at their rear.

The manner in which the cross bar 75 is secured to the tractor vehicles 11 and 12 is best shown in FIG. 5. Referring to that figure which shows the manner in which cross bars 75 and 79 are secured to the tractor 12, it will be noted that there is a bracket 82 secured to the under side of the frame of tractor vehicle 12 and having downwardly extending arms 83 and 84. The cross beam 75 is located between arms 83 and 84 and secured thereto by a pivot pin 85. In this way, the cross bar 75 is coupled to the tractor 12 in such a way as to permit rocking movement of the tractor with respect to cross bar 75 about the longitudinal axis of the tractor. The cross bar 79 is secured to the rear of tractor 12 by means of an upstanding flange 86 which is pivotally secured at 87 by a bracket 88 secured to the rear of the tractor. Again, the pivotal connection between the rear cross bar 79 and the tractor 12 is such that the tractor 12 can rotate about its longitudinal axis with respect to bar 79.

A pull rod 90 extends between the cross beams 75 and 79. As best shown in FIG. 6, the cross beam 85 has two downwardly extending ears 93 and 94. The forward end of the pull rod 90 extends between ears 93 and 94 and is secured thereto by a pivot pin 91. The rear end of the pull rod 90 is similarly connected to the rear cross bar 79 by a pivotal connection 96. These pivotal connections 91 and 96 are capable of exerting a pulling force.

It is to be understood that tractor 11 is connected in the same manner to the cross bars 75 and 79 as has just been described in connection with tractor 12. Thus, the tractor 11 has on its under side a bracket including downwardly extending flanges 100 and 101 which are shown in dotted lines in FIG. 1. The cross beam 75 is journaled between flanges 100 and 101. Similarly, the rear beam 79 is pivotally connected at 103 to the rear tractor 11. Again, the pivotal connection is such that the tractor vehicle 11 can rock with respect to cross bar 79 about the longitudinal axis of the tractor vehicle. Similarly, there is a pull rod 99 extending between the front cross beam 75 and the rear cross beam 79. This pull rod is fastened to the cross beams 75 and 79 in a manner which is similar to that which has been described in connection with pull rod 90.

There is also a third pull rod 105 which is connected to the beam 75 adjacent the point where it is pivotally secured to the center yoke 58, as shown in FIG. 4. It will be noted that the beam 75 has a pair of downwardly depending flanges 107 and that the pull rod 105 is pivotally secured to these flanges by a pivot pin 108.

It will be seen from the above that the cross bars 75 and 79 are connected together by three pull rods 90, 99 and 105. It will readily be apparent that when the tractor vehicles 10, 11 and 12 are moving in a forward direction, the tractor vehicle 10 will exert a pull on the cross beam 75 through the center yoke 58. At the same time, the two tractors 11 and 12 will be pushing this beam 75 and will be pulling cross beam 79. The rear cross beam 79 is in effect being pulled by the front cross beam 75 as well as by tractor vehicles 11 and 12. As will be explained later, the rear cross beam 79 is the one to which the implements and any other devices to be drawn by the tractor are attached. When it is desired to turn, the hydraulic cylinders 74 and 75 are actuated in the manner described above by the operation of the steering wheel or other steering device in the operator's cab, with the result that the center yoke 58 is rotated with respect to the longitudinal axis of tractor 10. This causes, as the vehicle moves, a change in the angular position of the cross bar 75 with respect to the tractor 10. Since the tractor vehicles 11 and 12 are attached to the cross bar 75, they likewise change their angular position with respect to the longitudinal axis of the vehicle 10. In this way, even though the axles to which the wheels of the various tractor vehicles are attached are not rotatable about a vertical axis and even though the wheels cannot turn with respect to the axles, the tractor is still caused to turn. The tractor will continue turning until the steering wheel or other steering control is rotated back to a neutral position to allow the center yoke 58 to resume the position with respect to tractor vehicle 10 shown in FIG. 1.

Because of the fact that the cross beam 75 can rotate about the longitudinal axis of tractor 10, and because each of the tractor vehicles 11 and 12 can rotate with respect to the cross beam 75 about the longitudinal axis of these vehicles, it is possible to drive the tractor vehicle over some very irregular ground without placing any strain upon the coupling mechanism. This is shown in FIG. 3 in which the irregularity of the ground has been exaggerated to indicate the flexibility. It will be noted that the main tractor 10 is tilted to the left while each of the vehicles 11 and 12 are tilted to the right. It is of course to be understood that the tractors 11 and 12 do not have to tilt in the same direction and can readily tilt in opposite directions with respect to each other. Tilting can take place very freely because of the fact that the connections of the tractor vehicles 11 and 12 to the cross bars 75 and 79 are such as to permit free tilting of the tractors about their longitudinal axes with respect to these bars 75 and 79.

It is also to be noted from FIG. 1 that the wheels 19 and 20 of the lead tractor 10 are displaced from wheels 22, 23, 25 and 26 so that each of these wheels follows a different path along the ground. This tends to minimize packing of the ground which would otherwise occur if the wheels of the vehicles in the rear followed in the same path as the wheels of the vehicles in front.

Brief reference has been made to the controls of the throttles of the rear tractor vehicles 11 and 12. Throttle levers 52 and 54 are controlled in two different manners. In the first place, it is desired that when the control lever 35 in the operator's compartment is moved, the throttles of all three engines be moved simultaneously. Normally, these vehicles are all operated at full throttle. Regardless of whether they are or not, however, it is desirable that if each of the engines is to contribute substantially the same force, the throttles of the three tractors should be set at substantially the same position. It is also desirable, however, when the tractors are turning that the engine of the rear tractor vehicle that is on the inside of the turn be operated at a somewhat lower speed than is the engine of the rear tractor on the outside of the turn. As is well understood, whenever a vehicle employing laterally spaced wheels is turned, it is necessary in order to avoid skidding of the tires to have the wheel on the outside of the turn rotate at a higher speed than the wheel on the inside of the turn. In the ordinary vehicle employing a single driving mechanism, this is taken care of by a differential which allows for a difference in the speed of the wheels on the inside and outside of the turn. Where, however, as in the present case, separate engines are employed to drive the wheels on the inside of the turn and the outside of the turn, it becomes more difficult to use a differential. The arrangement which is shown as being employed in connection with the embodiment shown in the application is, as pointed out, one in which the tractor on the inside of the turn is operated at a lower speed than the tractor vehicle on the outside of the turn. A suitable throttle control system is described in more detail in the copending application of Jerauld D. Joubert Ser. No. 746,154 for "Throttle Control For Articulated Tractor With Multiple Power Plants", filed Nov. 30, 1976 of even date herewith, of common ownership with the present application.

Referring specifically to the mechanism employed, both cables 37 and 39 which, as previously pointed out, are located in cable housings 40 and 41, extend through the cross bar 110 of a cable actuator 111 (FIG. 4). The cross bar 110 is pivotally mounted upon the upper plate 60 by being secured to a sleeve 112 journaled on a pivot 113 fastened to the plate 60. Thus, as best shown in FIGS. 1 and 4, the cross bar 110 is rotatable about the pivot pin supporting the sleeve 112. Bracket 115, secured rigidly to the upper plate 60 supports two sleeves 117 and 118. Extending through these sleeves are the two cables 53 and 55 attached to the throttle levers 52 and 54. These cables extend through cable housings 119 and 120 which are clamped in position. The cables 53 and 55 are secured to the ends of plungers 122, only one of which appears in FIG. 4. Each of these plungers has a head 124 which bears against the cross bar 110 and is biased into engagement therewith by a spring 121. The cables 37 and 39 leading from the throttle actuating mechanism 36 are capable of both exerting a pull and exerting a push. When the throttle lever 35 is in throttle retarding position, the ends of cables 37 and 39 force plungers 122 rearwardly to cause cables 53 and 55 to move to throttle retarding position. When the throttle lever 35 is moved in a direction towards the top of FIG. 1, a pull is exerted upon the cables 37 and 39 allowing the heads 124 of plungers 120 to move into engagement with the cross bar 110. In this condition, the cables 53 and 55 are pulled forwardly since they are secured to plungers 122. When the lever 35 is moved to full throttle position, the heads of plungers 122 are in engagement with the cross bar 110 and maintain the throttle levers 52 and 54 of the engines of tractor vehicles 11 and 12 in full throttle position. It is quite customary in driving such tractors to continuously operate all of the tractor vehicles in full throttle position. It is of course understood that when the throttle lever 35 is moved to full throttle position, the cable 38 leading to the throttle lever of tractor vehicle 10 is likewise moved to full throttle position.

As previously pointed out, the cross bar 110 is pivotally secured to sleeve 112 which is pivotally mounted in the plate 110. Secured to the cross bar 110 and extending forwardly therefrom is a rod 127 which extends between two spaced pins 129 and 130, only one of which is shown in FIG. 4 but both of which are shown in FIG. 1. These pins are mounted upon the upper plate 63 which is rigidly secured to the frame of the tractor vehicle 10. Any appreciable turning of the tractor 10 with respect to the cross bar 75 and hence with respect to tractor vehicles 11 and 12 will cause rod 127 to engage one or the other of the two stop pins 129 and 130. Continued turning of the vehicle will cause the rod 127 to rock the cross bar 110 about the pivot pin 113. This will cause the cross bar 110 to compress the spring 121 associated with one of the sleeves 122, moving that sleeve backwardly and forcing the cable attached thereto rearwardly. At the same time, cross bar 110 will move away from the head 124 associated with the other sleeve. Secured to the ends of each of the sleeves 122 are stop nuts 125 which limit the forward movement of the sleeve to full throttle open position. Thus, under this condition, one of the throttles of the engines of tractor vehicles 11 and 12 is left in full throttle position whereas the other throttle is retarded. If one observes FIG. 1, it will be readily apparent that if the tractor vehicle 10 turns to the right, for example, the rod 127 will engage the pin 130 and will cause the plate 110 to be tilted in a counterclockwise direction. This will compress the spring on the left hand side, moving the plunger backwardly and moving cable 55 in a throttle retarding direction. Since the spring on the right hand side is already fully advanced, the cable 53 will be undisturbed and the throttle 52 will remain in full throttle position. When tractor 10 is turned to the right as just described, it will be obvious that the tractor vehicle 12 will be on the inside of the turn and the tractor 11 on the outside of the turn. Thus, by reason of the mechanism described, the throttle on the engine 12 on the inside of the turn is retarded whereas the engine 11 on the outside of the turn is allowed to remain running at full speed. In this way, provision is made for facilitating turning the tractors without skidding of the wheels of the rear tractors.

As best shown in FIGS. 1 and 3, the rear cross bar 79 which, as previously explained, is employed for pulling any implement or other machinery attached to the tractor, has an implement hitch 135 attached to it. This implement hitch, as best shown in FIG. 3, has two spaced plates 136 and 137 which are rigidly secured to the rear cross bar 79. These cross bars have aligned apertures and a coupling pin 138 is designed to move down through the apertures in the plates 136 and 137. In practice, the tongue of an implement is placed between the plates 136 and 137 with the aperture in the tongue being aligned with the apertures in the plates 136 and 137. The coupling pin 138 is then passed through the aligned apertures. The problem with this conventional arrangement is that after a tractor has been pulling an implement, it is often extremely hard to withdraw the coupling pin 138. Furthermore, when the implement is moved into coupling engagement, if there is not exact alignment between the apertures in the plates 136 and 137 and the aperture in the tongue of the implement, it is often very difficult to insert the coupling pin 138 in the aligned apertures. To overcome this problem, the present apparatus provides a hydraulic cylinder 139 which is designed to operate the coupling pin 138. The plunger of this hydraulic cylinder is secured to the pin 138 and the upper end of the hydraulic cylinder 139 is secured to an upright bracket 140 fastened to the plate 136. The hydraulic cylinder 139 may be controlled by suitable valves which may be in the operator's cab or which may be located at the rear of the tractor where they can be operated while observing the operation of the coupling pin 138. In this manner, it is possible to apply tremendous force to the coupling pin 138 and to either withdraw or insert it with a minimum of effort on the part of the operator.

To expedite further the coupling of an implement, a hydraulic hoist 145 is employed in connection with the tractor. It will be obvious that in huge tractors of the size of the present invention, the implements are of correspondingly large size and it is often difficult to lift up the tongue of the implement and insert the tongue into the space between plates 136 and 137 and align the aperture in the tongue with the holes in plates 136 and 137. To facilitate the lifting of the implement, I have provided the hydraulic hoist 145 which has a swingable arm 146 which is pivotally connected to sleeves 150 and 151 journaled on a stanchion 149. Connected between sleeve 151 and the bar 146 is a hydraulic cylinder 152 for swinging the arm 146 up and down. Secured to the end of the arm 146 is the usual chain 147 and hook 148, which are attached to the implement which it is desired to lift into coupling position. Again, the hydraulic cylinder may be controlled by a valve located adjacent to the rear of the vehicle to enable it to be readily operated while observing the position of the implement. The arm 146 of the hydraulic hoist 145 normally is retained against the rear of the tractor by a bracket 154 in which the arm 146 rests. When it is desired to use the hoist, the hydraulic cylinder can be actuated to raise the rod 146. Thereafter, it can be swung to any desired angular position and the chain 147 and hook 148 can be attached to the implement to be lifted. The hydraulic cylinder then can be operated to lift the implement to a position in which the tongue can be readily inserted between the plates 136 and 137 and maneuvered into the desired position.

With the combination of the hydraulically actuated coupling pin 138 and the hydraulic hoist 145, it is possible for an operator to couple successfully with no assistance very large implements of the type which would be pulled by tractors of the type of the present invention.

CONCLUSION

It will be seen that I have provided a tractor in which there are at least three tractor vehicles each with their own engine. All of them are controlled by a single operator. Despite the fact that there are a number of tractor vehicles, each vehicle can readily adjust to the terrain without placing any strain upon the coupling mechanism. At the same time, regardless of the position of the vehicle, power is transmitted by the vehicle to a coupling device to which implements or other devices to be drawn by the tractor are attached. While I have shown three such tractor vehicles, it is to be understood that the invention is in no way limited to this. Obviously, the invention could be extended to the use of other combinations of tractor vehicles.

While I have shown a specific embodiment of my invention for purposes of illustration, it is to be understood that the scope of the invention is limited solely by the appended claims.

I claim:

1. An articulated tractor comprising first, second, and third tractor vehicles each having a rotatable axle, a pair of ground engaging driving elements coupled to said axle adjacent opposite ends thereof, and an engine drivingly connected to said axle to drive said driving elements, said first tractor vehicle also having an operator's compartment, a cross bar extending transversely of the longitudinal axes of said first, second and third tractor vehicles, first pivotal means pivotally securing said cross bar adjacent the longitudinal midpoint thereof to the rear of said first tractor vehicle for pivotal movement both about a generally vertical axis and about a generally horizontal axis, second and third pivotal means securing said second and third tractor vehicles at the front thereof to said cross bar at points equally spaced from said first pivotal means so that the longitudinal axes of said second and third tractors are normally substantially parallel to each other, and steering means including a steering control in the operator's compartment of said first tractor vehicle for changing the angular relationship of said cross bar to said first tractor vehicle to cause the longitudinal axes of said second and third tractor vehicles to assume temporarily an angular relationship with the longitudinal axis of said first tractor vehicle.

2. The tractor of claim 1 in which said second and third pivotal means provide for pivotal movement of said second and third tractor vehicles with respect to said cross bar along the longitudinal axes of said vehicles.

3. The tractor of claim 1 in which there is a second cross bar pivotally connected to said second and third tractor vehicles at the rear thereof.

4. The tractor of claim 3 in which there is a pull rod extending between said two cross bars to transmit pulling forces from said first named cross bar to said second cross bar.

5. The tractor of claim 4 in which said second cross bar has means for coupling the same to an implement to be pulled by said tractor.

6. The tractor of claim 4 in which there are three such pull rods extending between said first named cross bar and said second cross bar, one of said pull rods extending between substantially the midpoints of said cross bars and the other two of said cross bars extending between the pivotal connections of said second and third tractor vehicles to said two cross bars.

7. The tractor of claim 3 in which there is means for pivotally securing said second cross bar to said second and third tractor vehicles for rocking movement of said vehicles with respect to said second cross bar about the longitudinal center axes of said vehicles.

8. The tractor of claim 1 in which said first pivotal means comprises a center yoke which is pivoted about a generally vertical axis near the front thereof to said first tractor vehicle and is pivoted about a generally horizontal axis to said cross bar.

9. The tractor of claim 1 in which said ground engaging driving elements are wheels and in which the axles of all of said tractor vehicles are secured against turning with respect to a vertical axis.

* * * * *